(12) United States Patent
Rhoads et al.

(10) Patent No.: US 6,229,924 B1
(45) Date of Patent: May 8, 2001

(54) METHOD AND APPARATUS FOR WATERMARKING VIDEO IMAGES

(75) Inventors: Geoffrey B. Rhoads, West Linn; Clay Davidson, Lake Oswego; Anthony Rodriguez, Portland, all of OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/138,061

(22) Filed: Aug. 21, 1998

Related U.S. Application Data

(63) Continuation-in-part of application No. 08/746,613, filed on Nov. 12, 1996, now Pat. No. 6,122,403, which is a continuation-in-part of application No. 08/649,419, filed on May 16, 1998, now Pat. No. 5,862,260.
(60) Provisional application No. 60/056,968, filed on Aug. 26, 1997.

(51) Int. Cl.[7] ....................................................... G06K 9/36
(52) U.S. Cl. ............................................. 382/232; 382/100
(58) Field of Search ..................................... 382/100, 232, 382/280, 284, 287; 395/135; 380/4, 23, 25, 51, 54; 283/6, 93, 94; 348/475; 235/494; 358/448, 450, 454, 124, 142

(56) References Cited

U.S. PATENT DOCUMENTS

| | | | |
|---|---|---|---|
| 5,748,783 | * | 5/1998 | Rhoads .................................. 382/232 |
| 5,778,102 | | 7/1998 | Sandford .............................. 382/251 |
| 5,809,139 | | 9/1998 | Girod ....................................... 380/5 |

(List continued on next page.)

FOREIGN PATENT DOCUMENTS

| | | | | |
|---|---|---|---|---|
| 0411232 A3 | * | 6/1991 | (EP) | .............................. H04N/1/411 |
| 0705025 A2 | * | 4/1996 | (EP) | ................................ H04N/1/40 |
| 0855681 | | 7/1998 | (EP) | . |
| 0855829 | | 7/1998 | (EP) | . |
| 0860793 | | 8/1998 | (EP) | . |
| 0887764 | | 12/1998 | (EP) | . |
| 2196167 | * | 4/1988 | (GB) | .............................. G11B/20/08 |
| 89/08915 | * | 9/1989 | (WO) | .............................. G11B/20/10 |
| 93/25038 | * | 12/1993 | (WO) | .............................. H04N/1/00 |
| WO 96/27264 | | 9/1996 | (WO) | . |
| 96/27259 | * | 9/1996 | (WO) | .............................. H04N/1/32 |
| WO 99/18723 | | 4/1999 | (WO) | . |

OTHER PUBLICATIONS

Dautzenberg, Christoph, "Watermarking Images," pp. 1–47, Oct. 1994.*
Workpackage 8: Watermarking, pp 1–46, Jun. 1995.*
Tanaka et al., "A Visual Retrieval System with Private Information for Image Database", Int'l Conf. on DSP Application & Technology, pp 415–421, Oct. 1991*

(List continued on next page.)

Primary Examiner—Jose L. Couso
(74) Attorney, Agent, or Firm—Elmer Galbi

(57) ABSTRACT

Embedding a watermark in an image by changing selected DCT coefficients in the blocks and macro blocks of coefficients which represent the image. The changes in the blocks that comprise each macro block are done in a coordinated manner so that the phase of the watermark signal is preserved across the block boundaries. By preserving the phase across block boundaries, a detectable grid is formed which can be used as an orientation and scaling grid. Furthermore, by preserving the phase across the block boundaries the visual artifacts introduced by the watermark are minimized. The bit rate of the image signal is preserved by maintaining a count (referred to as the cumulative change count) that represents the amount that the bit rate has been increased by changes in coefficients less the amount that the bit rate has been decreased by changes in the coefficients. If at any time the cumulative change count exceeds a pre-established limit, coefficient changes that decrease the cumulative change count continue; however, coefficient changes that increase the cumulative change count are suspended. The suspension of coefficient changes that increase the cumulative change count continues until the cumulative change count falls below the pre-established limit.

2 Claims, 4 Drawing Sheets

U.S. PATENT DOCUMENTS

| | | | |
|---|---|---|---|
| 5,825,892 | * 10/1998 | Braudway et al. | 380/51 |
| 5,848,155 | 12/1998 | Cox | 380/4 |
| 5,862,260 | * 1/1999 | Rhoads | 382/232 |
| 5,901,178 | 5/1999 | Lee | 375/240 |
| 5,903,892 | 5/1999 | Hoffert | 707/10 |
| 5,905,819 | 5/1999 | Daly | 382/284 |
| 5,915,027 | * 6/1999 | Cox et al. | 380/54 |
| 5,930,369 | 7/1999 | Cox | 380/54 |
| 5,933,798 | 8/1999 | Linnartz | 702/191 |
| 5,949,055 | 9/1999 | Fleet et al. | 235/469 |
| 5,949,885 | 9/1999 | Leighton | 380/54 |
| 5,956,716 | 9/1999 | Kenner | 707/10 |
| 5,960,081 | 9/1999 | Vynne | 380/10 |
| 5,983,176 | 11/1999 | Hoffert | 704/233 |
| 5,987,459 | 11/1999 | Swanson | 707/6 |
| 6,031,914 | 2/2000 | Tewfik | 380/54 |
| 6,037,984 | 3/2000 | Isnardi | 348/403 |
| 6,061,451 | 5/2000 | Muratani | 380/201 |
| 6,061,793 | 5/2000 | Tewfik | 713/176 |
| 6,069,914 | 5/2000 | Cox | 375/150 |
| 6,094,722 | 7/2000 | Astola | 713/176 |
| 6,104,826 | 8/2000 | Nakagawa | 382/100 |
| 6,108,434 | 8/2000 | Cox | 382/100 |

OTHER PUBLICATIONS

Bors et al., "Embedding Parametric Digital Signatures in Images", pp. 1–4.*

De Castro et al., Registration of Translated and Rotated Images Using Finite Fourier Transform, IEEE, pp 700–703, Sep. 1987.*

Schyudel et al., "A digital Watermark", IEEE, pp. 86–90, Nov. 1994.*

Zhao et al., Embedding Robust Labels into Images for Copyright Protection, pp 1–10, Aug. 1995.*

Nakamura, et al., A Unified Coding Method of Dithered Image and Text Data Using Micropatterns, pp 50–56, Dec. 1987.*

Tanaka et al., Embedding Secret Information into a Dithered Multi–Level Image, pp. 216–220, 1990.*

Nakamura et al., A Unified Coding Method of Dithered Image and Text Data Using Carthogral Transform pp. 87–92, Mar. 1989.*

Upham, Derek "Independent JPEG Group's JPEG Sofware" pp 1–2, Jun. 1993*

Burgett et al., "A Novel Method for Copyright Labeling Digitized Image Data", pp. 1–12, 1995.*

* cited by examiner

METHOD AND APPARATUS FOR WATERMARKING VIDEO IMAGES

RELATED APPLICATIONS

This application is:

1) a continuation in part of Patent application No. 60/056,968, which was, filed on Aug. 8. 1997 and which is now pending,
2) a continuation in part of application Ser. No. 08/746,613 filed Nov. 12, 1996 which is now U.S. Pat. No. 6,122,403 and
3) a continuation in part of application Ser. No. 08/649,419 which was filed May 16, 1998 which is now U.S. Pat. No. 5,862,260.

FIELD OF THE INVENTION

This invention relates to stenography, to copy protection and to applying and detecting digital watermarks in video images.

BACKGROUND OF THE INVENTION

The advent of technology for storing images on digital media has increased the need for a method to protect against piracy. Images stored on prior forms of media (e.g. VHS, Beta, audiotapes, etc) are inherently degraded when copied. Images stored on digitally encoded media can be copied with no degradation; therefore, perfect copies of copies of copies, etc. can be made.

The introduction of Digital Versatile Discs (DVD) containing movies has created increased incentives for both casual and professional unauthorized copying. At the movie industry's urging, technology has been put in place to protect against simple duplication of DVD disks using equipment available to unsophisticated consumers. This is similar to the protection that exists which prevents one from duplicating a VCR tape by connecting together two commercially available VCRs.

While such protection mechanisms protect against some types of copying, a personal computer connected to a DVD device present a much more complicated problem. Open architecture devices such as personal computers reproduce the signals in the "clear" and such devices have many entry points, which can be used to duplicate material once it is in the "clear". The present invention uses digital watermarks to address the above described problem. The present invention also has other applications.

It is known that to facilitate the detection of digital watermarks one can insert a watermark signal that forms a grid. The grid can be used to determine orientation and scale. With the present invention the data signal and the grid signal are integrated into a single watermark signal in such a manner that the visual artifacts introduced by the watermark are minimized.

In applications such as DVD, an important factor that needs be considered is the bit rate of the bit stream. There are disadvantages if introduction of a watermark into a bit stream changes the bit rate. For example if images are going to be recorded on a medium such as a DVD disc, increasing the number of bits in the bit stream will decrease the number of images that can be recorded on a single disk. It is known that, in general, adding a watermark to a stream of images will increase the number of bits in the bit stream. The present invention provides a method and apparatus, which preserves the bit rate even though watermarks are introduced into the images.

SUMMARY OF THE INVENTION

The well-known JPEG and MPEG data compression techniques transform images utilizing a direct cosine transform (DCT) which produces a matrix of DCT coefficients. These coefficients are arranged into blocks (e.g. into 8 by 8 blocks of coefficients). The blocks of DCT coefficients are in turn arranged into macro blocks (e.g. into 16 by 16 arrays containing four 8 by 8 blocks). With the present invention selected DCT coefficients in each block are slightly increased or slightly decreased in response to a watermark signal. The changes in the blocks that comprise each macro block are done in a coordinated manner so that the phase of the watermark signal is preserved across the block boundaries. By preserving the phase across block boundaries, a detectable grid is formed which can be used as an orientation and scaling grid.

The present invention also maintains the bit rate of the image signal. The bit rate of the signal is preserved by maintaining a count (referred to as the cumulative change count) that represents the amount that the bit rate has been increased by changes in coefficients less the amount that the bit rate has been decreased by changes in the coefficients. If at any time the cumulative change count exceeds a pre-established limit, coefficient changes that decrease the cumulative change count continue; however, coefficient changes that increase the cumulative change count are suspended. The suspension of coefficient changes that increase the cumulative change count continues until the cumulative change count falls below the pre-established limit. The above described process can be described as selectively changing the intensity of a watermark signal in a bit stream so as to prevent the entropy of the combined signal from exceeding a pre-established limit.

DESCRIPTION OF PREFERRED EMBODIMENTS

The well know MPEG (Motion Picture Expert Group) and JPEG (Joint Photographic Expert Group) image compression techniques use a DCT (Discreet Cosine Transform) to generate a matrix of coefficients. The preferred embodiment of the invention shown herein slightly modifies the DCT coefficients (either slightly increases or slightly decreases the value of the coefficients) so as to embed a digital watermark in the image. Such a digital watermark can later be detected by conventional cross correlation techniques.

Figure 1:
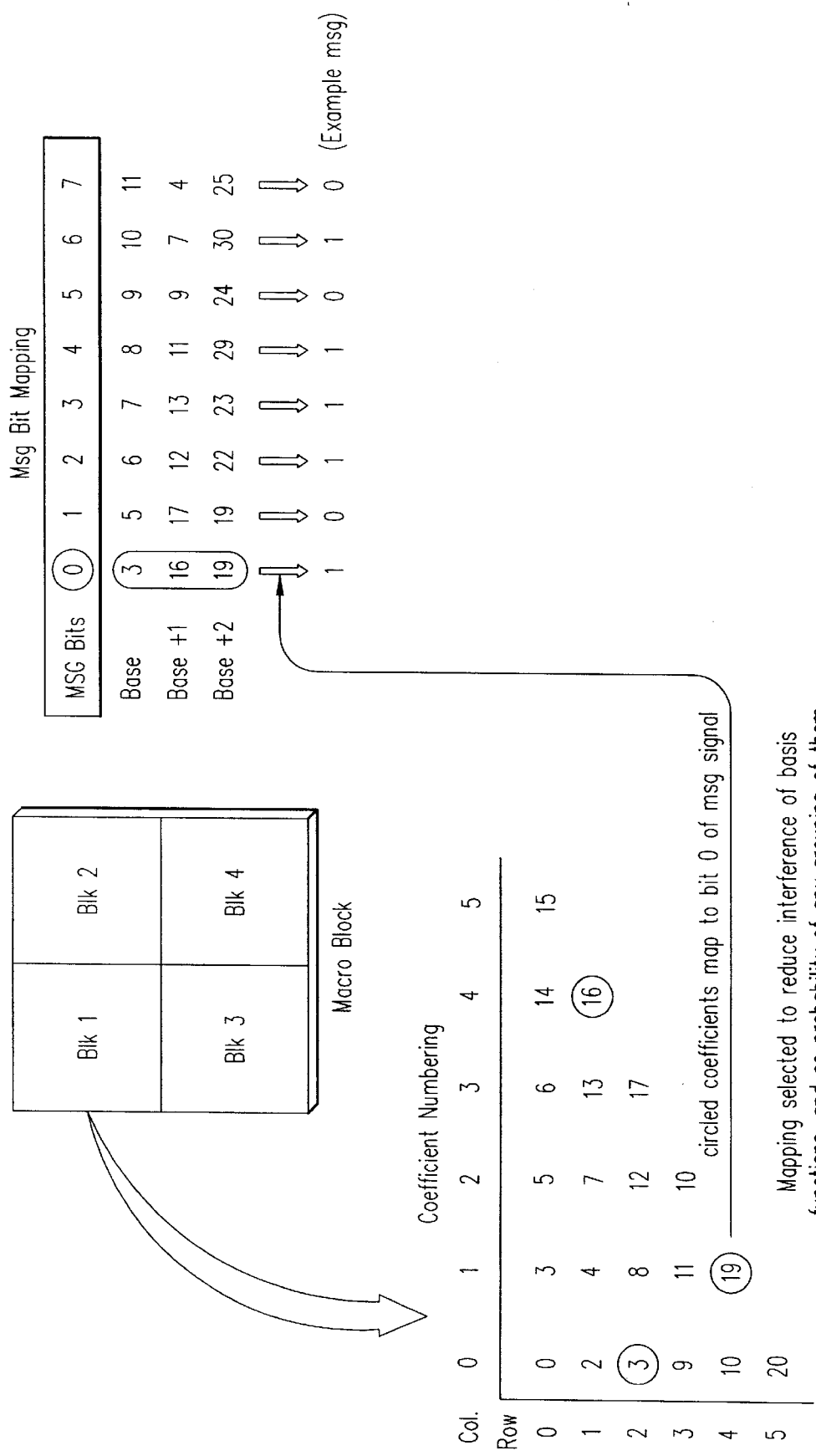
FIG. 1 is a diagram illustrating how the pixels in an image are arranged into blocks and how the resulting DCT coefficients are numbered.
Figure 2:
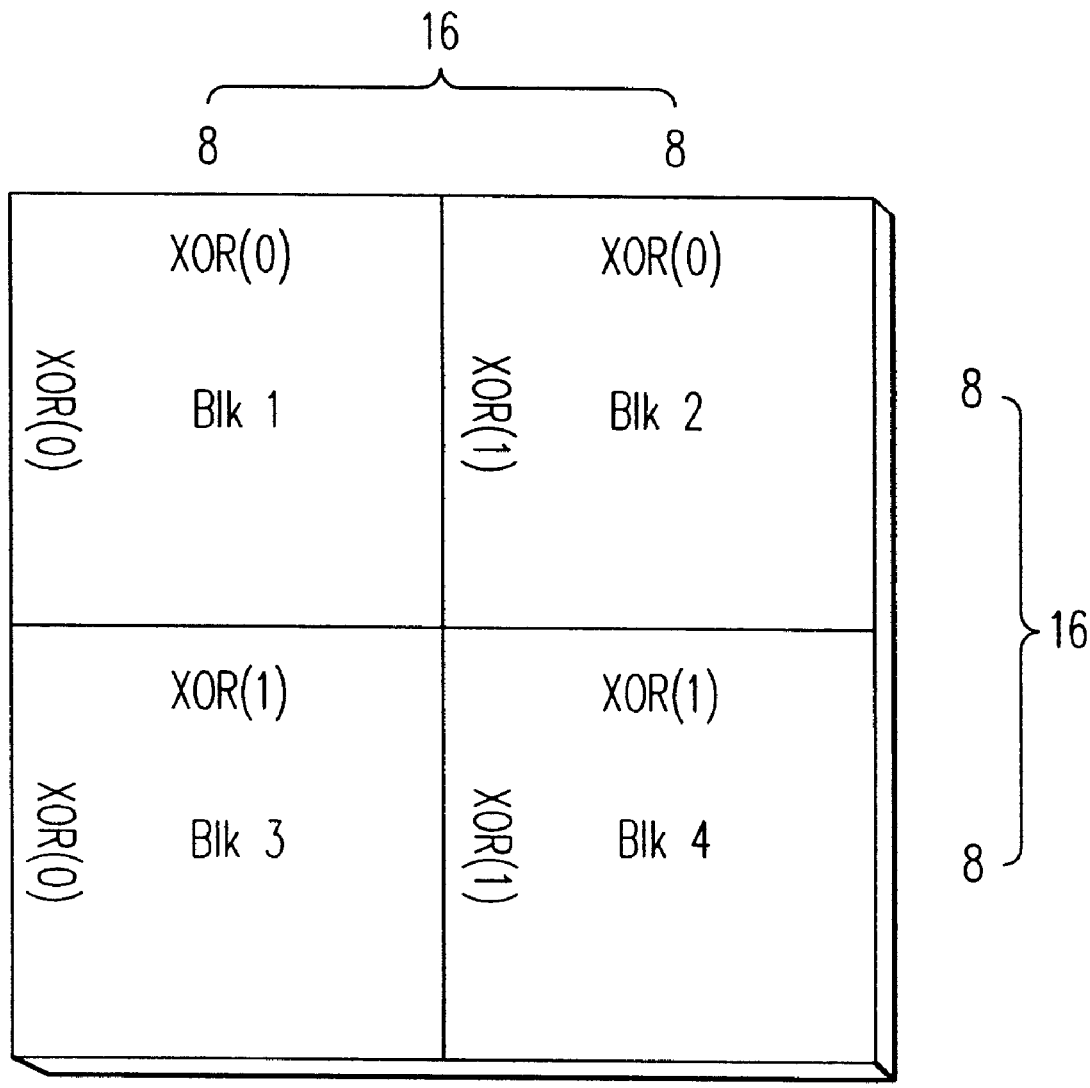
FIG. 2 is a diagram, which shows how the blocks of DCT coefficients are arranged into macro blocks.

As illustrated in FIG. 1, the MPEG and JPEG techniques divide an image into 8 by 8 blocks of pixels. Each block of pixels is then used to generate an eight by eight block of DCT coefficients. The 8 by 8 blocks of coefficients are divided into "macro blocks", each of which consist of four of the original blocks. This is illustrated in FIG. 2. The rows and columns of DCT coefficients in each block are numbered from top to bottom and left to right as illustrated in FIG. 1. The first row and the first column are designated as the "0" row and "0" column.

Certain of the DCT coefficients in each block are selected as the coefficients that will carry a selected bit of the digital watermark signal. In the preferred embodiment the three coefficients circled in FIG. 1 are used to carry the first or "0" bit of the watermark data signal. These three coefficients are modified, that is, either slightly increased or slightly decreased depending upon the value of the "0" bit of the watermark data. In a similar manner other coefficients are slightly changed in order to carry the other bits of the watermark signal.

One aspect of the present invention is directed to insuring that the sinusoids generated by the changes made to the DCT coefficients are continuous, that is, in-phase across the four blocks that constitute each macro block. First, if the sinusoids that carry the watermark are continuous across each macro block, there will be less edge effects and the watermark will be less visually noticeable. Second, the sinusoids which are continuous over the four blocks of each macro block create a low level orientation or grid signal. This low level grid signal can be detected to determine the orientation and scale of the watermark. The grid signal can then be detected using the cross correlation techniques. Cross correlation detection techniques are for example shown in copending patent application 08/649,149 filed May 16, 1996 and in issued U.S. Pat. Nos. 5,748,763 and 5,748,782.

If certain DCT coefficients in adjacent blocks are modified in the same direction, the resulting sinusoids will not be continuous across block boundaries. With the present invention the changes made to the coefficients of each of the four blocks in a macro block are coordinated so that the resulting sinusoids will be continuous across block boundaries within each macro block. The changes are coordinated using the rules explained below.

The blocks in each macro block are numbered as shown in FIG. 2. Block one is considered the base block. The coefficients in this block are changed in a conventional way by the associated bits of the watermark signal. Note, the following paragraphs relate to how the coefficients which are circled in FIG. 1 are changed in response to the "0" bit of the watermark. It should be understood that other coefficients must be similarly changed to carry the other bits in the watermark data.

In block 1, the coefficients that are circled in FIG. 1 are slightly increased or slightly decreased in response to the "0" bit of the watermark data. In blocks 2, 3 and 4, the circled coefficients shown in FIG. 1 are changed in response to the zero bit of the watermark according to the following rules.

Block 2: invert the direction of the change if the coefficient is in an odd row.

Block 3: invert the direction of the change if the coefficient is in an odd column Block 4: invert the direction of the change if the coefficient is in an odd row or if it is in and odd column, but do not invert the direction of the change if the coefficient is in both and odd row and in an odd column.

If the above rules are followed the sinusoids generated by the change in the DCT coefficients will be continuous across the boundaries in the four blocks that form each macro block. These sinusoids will be able to be detected using conventional cross correlation techniques and they can be used as a grid to determine the scale and rotation of the image. The data bits in the watermark will also be able to be detected using conventional watermark detection techniques. Thus, the watermark data itself is used to form the grid that can be used to determine scale and rotation.

Figure 3:
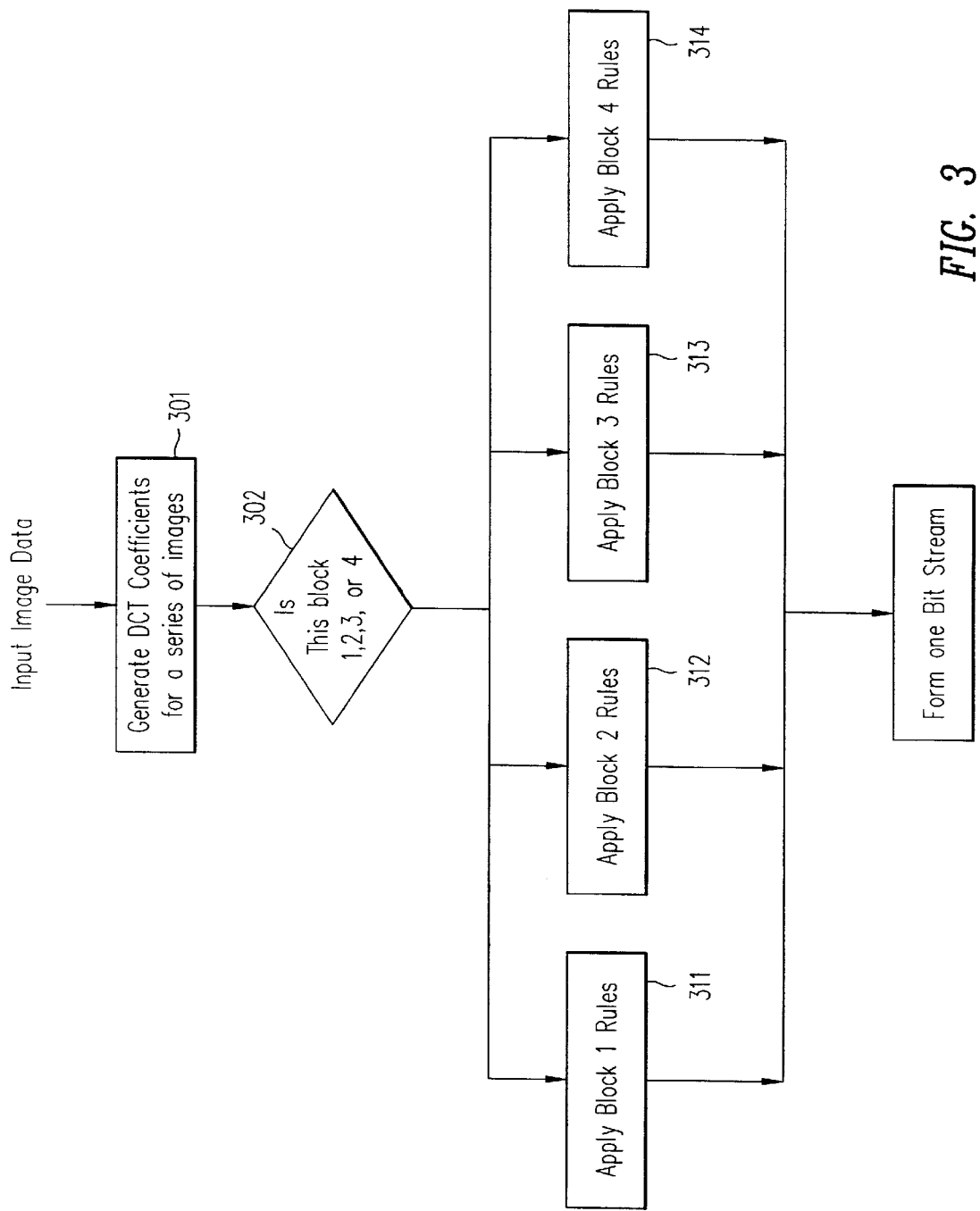
FIG. 3 is a program flow diagram showing how the coefficients in each block of a macro block are treated so as to preserve the phase of watermark signal in each macro block.

FIG. 3 is an overall program flow diagram of the above described aspect of the preferred embodiment The system accepts a stream of data that represents images. Block 301 is a conventional device or program module that generates DCT coefficients for the images in the data stream. These coefficients are sent to a decision unit 302 which separates the data into macro blocks and sends it to units 311, 312, 313 and 314 depending upon whether the data represents a block 1, 2, 3 or 4 in a macro block. Units 311–313 modify the DCT coefficients in order to imbed a watermark signal according to the following rules.

Unit 311: modify the coefficients in a conventional manner to imbed watermark.

Unit 312: invert the direction of the change if the coefficient is in an odd row.

Unit 313: invert the direction of the change if the coefficient is in an odd column Unit 314: invert the direction of the change id the coefficient is in an odd row or if it is in and odd column, but do not invert the direction of the change if the coefficient is in both and odd row and in an odd column.

The output of units 322 to 314 is combined by unit 320 back into a single data stream. It is noted that each of the units shown in FIG. 3 could be separate units, which are either programmed, or hardwired to perform the specified functions. Alternatively all the function could be performed in a single programmed computer on a time-shared basis. The unit which generates DCT coefficients is conventional and such units are know and not part of the present invention.

The previous discussion describes how a watermark can be introduced in the DCT domain. It is noted that the durability of the overall watermarking can be increased by using two watermarks. One watermark can be added by modification of the pixels in the original image in the manner as described in U.S. Pat. Nos. 5,748,763 or 5,748,783 and then a second watermark can be added by modification of the coefficients in the DCT domain as described herein.

Another problem addressed by the present invention is the need to maintain a constant bit rate in a stream of bits representing a series of images even though watermarks are added to the images. It is noted that MPEG and JPEG systems use variable length codes to represent data, hence, adding watermarks generally increases the bit rate of a data stream. Typical a watermark has no correlation with the image into which the watermark is embedded, thus embedding an image in a watermark produces an image which has a higher entropy than the original image. The bit rate of a data stream transmitting an image correlates directly to the entropy of the image.

Typically the number of codes used to code an image, that is, the number of entries in the Huffman table of a coded image, is relatively large (e.g. 500). However, the changes that occur when a watermark is introduced into an image can be illustrated with following simple example. Consider a data stream that has only four symbols, s1, s2, s3 and s4, which are encoded as follows:

| Symbol | code |
|--------|------|
| s1 | 0 |
| S2 | 01 |
| S3 | 110 |
| S4 | 111 |

Then consider a data stream as follows:
Bit stream: 0011010111010
Decoded stream 0/0/110/10/111/0/10
Decoded message: s1, s2, s3, s2, s4, s1, s2

When a watermark is added to an image the bits in the image are slightly changed. In the above simplistic illustrative example, in some situation the symbol s2 would be changed to the symbol s3 and hence the number of bits in a bit stream which transmits the image would be increased. In fact there are mathematical principles (not explained herein) which show that when a normally distributed watermark (that is, a watermark with a Gaussian distribution) is added to an image, and the image is transmitted using variable length Huffman codes, the length of the bit stream will of necessity be increased.

The present invention provides a technique for insuring that when a watermark is added to a data stream, the bit rate will be maintained constant. It is noted that the present invention does not violate the above-described mathematical principle, because with the present invention, some of the redundancy normally used to watermark images is in certain circumstances decreased. That is in certain circumstances the intensity of the watermark is decreased.

With the present invention, the watermark is modified in response to characteristics of the image. Thus, to some extent the watermark is correlated to the image into which the watermark in embedded. In this way a watermark can be embedded into an image and the entropy of the combined image and watermark will be substantially equal to the entropy of the watermark alone.

With the present invention, the system maintains a cumulative count of the amount that the coefficients have been changed to any point in time. That is, the amount of positive changes less the amount of negative changes made since the beginning of the bit stream is tracked. This amount is herein referred to as the cumulative change count. If at any time, the cumulative change count exceeds a pre-established positive limit, no further positive changes are made.

Normally it is only necessary to insure that changes do not increase the bit rate unduly; however, in some instances it may also be desirable to insure that changes do not unduly decrease the bit rate. If this is desired, the same technique as described above can be used to insure that the cumulative change amount does not exceed a pre established negative limit. That is, if the cumulative change amount exceeds a pre-established negative value, positive changes continue in a normal manner, but no further negative changes are made.

The magnitude of the pre-established maximum (and in both a positive and negative direction) are established at the values which constitutes the change in bit rate which can be tolerated in a particular system.

Figure 4:
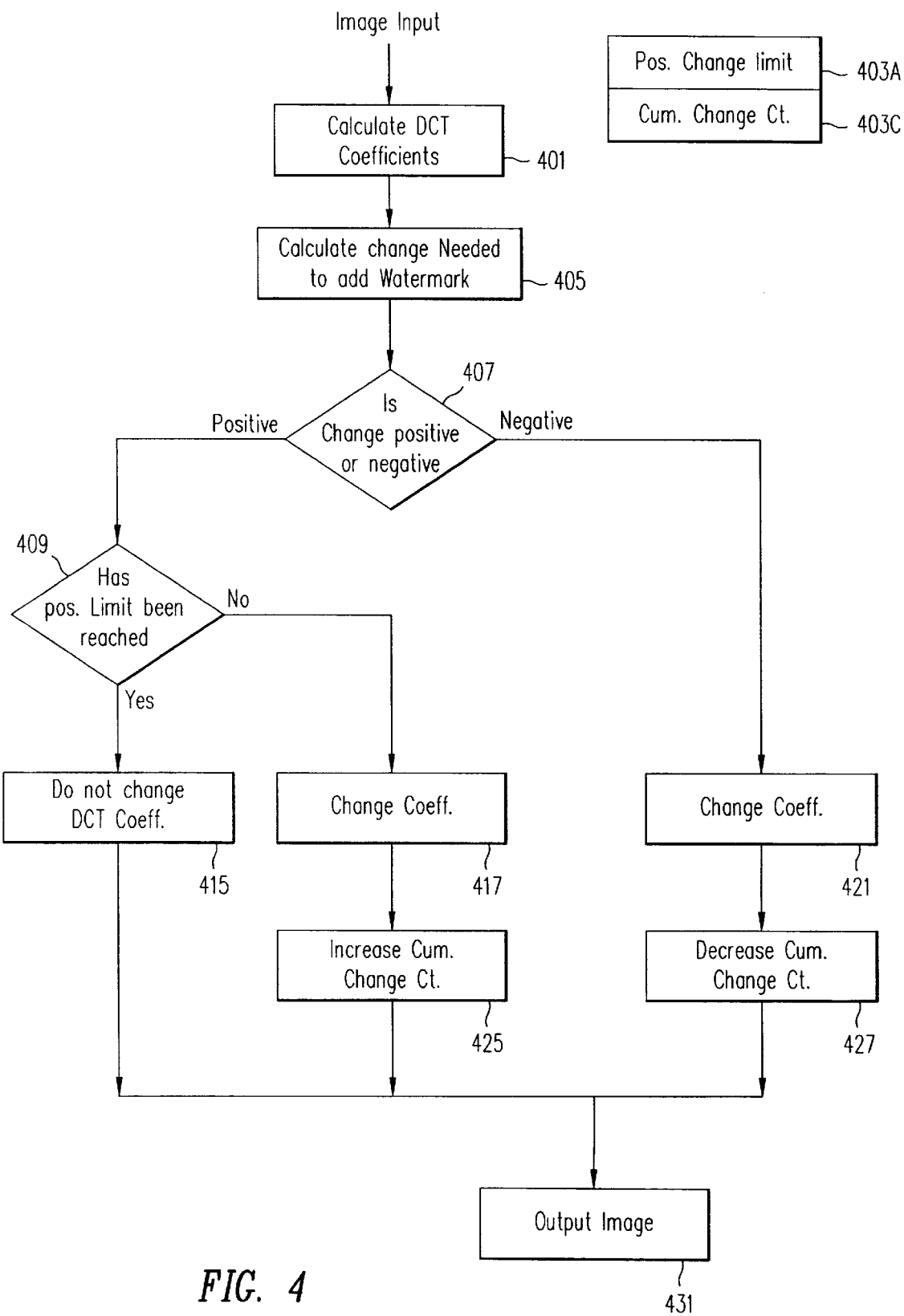
FIG. 4 is a program flow diagram showing how the bit rate in the data stream is maintained constant.

FIG. 4 is a program flow diagram showing how the data rate is maintained constant not withstanding the fact that watermarks are added to the images in the data stream. Block 403A shows that a limit on the amount of positive changes that can be made to DCT coefficients is established and stored. Blocks C shows that the cumulative change amount is stored. The cumulative change amount is the amount of positive changes less the amount of negative changes that have been made to coefficients since the start of the data stream.

The DCT coefficients are calculated in the normal manner as indicated by block 401. Likewise the change in each the DCT coefficients needed to embed the watermark is also calculated in the normal manner as shown by block 405. Block 405 shows that a check is made to determine if the needed change in a particular DCT coefficient is positive or negative. Block 409 indicates that if the change is positive a check is made to determine if the maximum allowable cumulative change amount stored in block 403A will be exceeded if the change is made.

Blocks 415, and 417 indicate that the coefficients will only be changed, if the change does not cause the cumulative change amount to exceed the limit in 403A. Finally as indicated by blocks 425 and 427, the cumulative change amount in register 403C is incremented or decremented if a change to the coefficients is in fact made. Block 431 indicates that the coefficients are sent to the output of this process and they are then transmitted and processed in a normal manner.

It is noted that the present invention relates to embedding a watermark in an image. Various know techniques can be used to detect watermarks embedded in images utilizing the present invention. For example techniques such as those described in U.S. Pat. Nos. 5,748,763, and 5,748,783 or in the "Communications of the ACM" July 1998/vol. 41, No.7. or in pending applications Ser. No. 08/746,613 filed Nov. 12, 1996 and Ser. No. 08/649,419 which was filed May 16, 1998 (all of which are hereby incorporated herein by reference) could be used.

While the process has been described above as one where a change is either made or not made, it should be understood that alternatively, the amount of the change could be decreased if the limit in the cumulative change value is being approached. It is also noted that the system shown in FIG. 4 prevents the cumulative change value from exceeding a pre established positive limit. Since adding a watermark to an image generally increases the entropy of the image and since Huffman code tables are normally constructed such that an increase in entropy result in increased bit rate, the use of only a positive limit is normally appropriate. However, in some situations, it may be appropriate to tract if the cumulative change amount exceeds a limit in both the positive and negative directions. Such a check could be added to FIG. 4 prior to block 427.

It is recognized that by implementing the present invention, the strength of the watermark is in some cases reduced. However, the reduction is not sufficient to prevent detection of the watermark. The changes made with the above invention merely lower the intensity of the watermark in a selective manner, thus in some instances more processing may be required to detect the watermark.

In many systems, each Huffman code covers several symbols. In such systems the calculation indicated by block 405 is not the change in a single symbol that results from adding a watermark to the image. In such systems the calculation indicated by block 405 is a calculation of the change that results in the bit string of whatever combination of symbols used in the Huffman code to represent a symbol. In some cases the calculation might have to be done over several combinations of symbols.

It is also noted that various aspects of the present invention are shown herein in a single preferred embodiment. Other alternative embodiments could use one but not all aspects of the present invention. For example the part of the present invention that relates to maintaining bit rate could be used in embodiments which do not use macro blocks to establish an orientation grid. Likewise the aspect of the present invention which relates to the use of macro blocks could be used without the part of the invention that relates to maintaining a constant bit rate. Finally, while the invention has been shown in an embodiment that inserts a watermark in the DCT domain, the invention could be used in applications where watermarks are inserted in other domains.

While the invention has been shown and described with respect to preferred embodiments of the invention, various changes in form and detail could be made without departing from the spirit and scope of the invention. The applicants invention is limited only by the appended claims.

We claim:

1. A method for adding a multibit watermark to an image comprising,
   - generating DCT (Discrete Cosine Transform) coefficients representing said image, said coefficients being arranged in blocks, said blocks being arranged into macro blocks,
   - each of said macro blocks containing a block one, a block two, a block three and a block four, and the coefficients in each block being arranged in rows and columns, alternate of said rows and columns being designated even and odd rows and columns, adjusting said coefficients as follows:
   - the coefficient in block one being changed directly in response to the bits of said watermark, the bits in blocks two, three and four being changed in accordance with the following rules:
     - Block two: invert the direction of the change if the coefficient is in an odd row,
     - Block three: invert the direction of the change if the coefficient is in an odd row column
     - Block four: invert the direction of the change if the coefficient is in an odd row or if it is in and odd column, but do no invert the direction of the change if the coefficient is in both and odd row and in an odd column,
   - whereby the sinusoids generated by said adjustments are in phase across block boundaries in each macro block.

2. A system for adding a multibit watermark to an image comprising,
   - means for generating DCT (Discreet Cosine Transform) coefficients representing said image, said coefficients being arranged in blocks, said blocks being arranged into macro blocks,
   - each of said macro blocks contains four blocks, block one, block two, block three and block four, the coefficients in said blocks being arranged in rows and columns, alternate of said rows and columns being designated even and odd rows and columns,
   - means for adjusting said coefficients in accordance with the bits of said watermark to embed said watermark in said image,
   - the coefficient in block one being changed directly in response to the bits of said watermark, the bits in blocks two, three and four being changed in accordance with the following rules:
     - Block two: invert the direction of the change if the coefficient is in an odd row,
     - Block three: invert the direction of the change if the coefficient is in an odd column
     - Block four: invert the direction of the change if the coefficient is in an odd row or if it is in and odd column, but do not invert the direction of the change if the coefficient is in both and odd row and in an odd column
   - whereby the sinusoids generated by said adjustments are in phase across block boundaries in each macro block, and
   - whereby the same changes which represent said watermark form a grid which can be used to detect the scale and rotation of said watermark.

* * * * *